Sept. 16, 1969    R. T. DOWNING    3,467,414
TUBE JOINT HAVING BUCKLED LOCKING MEANS
Filed Sept. 30, 1966    3 Sheets-Sheet 1

INVENTOR
RONALD T. DOWNING

BY *Miller, Morris & Pappas*
ATTORNEYS

Sept. 16, 1969          R. T. DOWNING          3,467,414

TUBE JOINT HAVING BUCKLED LOCKING MEANS

Filed Sept. 30, 1966          3 Sheets-Sheet 2

INVENTOR
RONALD T. DOWNING

BY
ATTORNEYS

Sept. 16, 1969     R. T. DOWNING     3,467,414

TUBE JOINT HAVING BUCKLED LOCKING MEANS

Filed Sept. 30, 1966     3 Sheets-Sheet 3

INVENTOR
RONALD T. DOWNING

BY *Miller, Morriss & Pappas*

ATTORNEYS

United States Patent Office 3,467,414
Patented Sept. 16, 1969

3,467,414
TUBE JOINT HAVING BUCKLED LOCKING MEANS
Ronald T. Downing, 5701 Taffy Parkway,
Lansing, Mich. 48910
Filed Sept. 30, 1966, Ser. No. 583,211
Int. Cl. F16l *13/14, 13/00*
U.S. Cl. 285—382.2
6 Claims

ABSTRACT OF THE DISCLOSURE

A tubular connection comprised of two tubular members having telescoped end portions which have been buckled into a circumferential mechanical interlocked engagement with each other and with the circumferential groove and shoulder of an internally positioned tubular mandrel.

---

The present invention relates to a tubular connection, and to the method of forming said connection by upsetting two telescoped tubular members into a circumferential mechanical interlock about an enclosed rigid tubular mandrel.

The art of fabricating cooling cores for refrigerating and air conditioning apparatus commonly utilizes a serpentine configuration of tubular elements winding through a plurality of spaced apart metallic, heat dissipating fins. These fins are oriented in a stacked parallel, spaced apart relation and are repeatedly penetrated by the undulating configuration of tubing which provides a maximum of surface exposure for optimal heat dissipation via the fins. The core is formed by a plurality of U-tubes transversely piercing the entire stack of fins, with adjacent ends of the tubes being joined by shorter, U-shaped tubular caps. Since both the tubes and caps are U-shaped they cannot be joined by a threaded connection; the U-tube cannot be turned or rotated after each of its arms is engaged through a plurality of registering holes in the stack of heat dissipating fins, and the U-cap cannot be turned for threading because each arm thereof is to be joined simultaneously to an adjacent arm of a U-tube. Methods other than thread connecting have been used, for example, silver soldering (of copper tubes), epoxy sealing of the joints, welding, etc.

Epoxy methods are encumbered by sloppiness of the resins employed, and the necessity of drying which introduces additional time and expense in the capping process. Furthermore, in aluminum tubes the oxide layer which is always present provides an additional obstacle to soldering.

It is well known that severe difficulties are connected with the soldering of aluminum, one common difficulty being deterioration of the metal by the fluxes used. Recently developed fluxless solders give good bonding characteristics, without flux attacking the metal, but produce brittle joints.

Butt welding is not a satisfactory approach to the problem, particularly in the cooling core art, because it leaves a circumferential bulge at the weld which presents an interior constriction to fluid flow within the tube. Because the connection closes the tube it is inaccessible to a drilling out of the constriction, even if this step were economically feasible.

The prior art most pertinent to the described problem of forming joints in cooling cores is believed to be represented by the disclosure of U.S. Letters Patent 2,816,211 to Hutchins, which teaches a joint formed by mechanically upsetting two tubular members into a circumferential interlock, in conjunction with a hot welding process to achieve a fluid tight connection. An interior tubular mandrel is utilized to support the tubular members being joined against radial inward collapse during the upsetting operation. The mandrel remains permanently inside the joint but does not contribute structurally thereto. It serves as a forming aid solely. One of the pair of tubular members has a bell portion, for forming the joint, a second constriction in diameter being necessary to form a second bell portion for maintaining a constant inside diameter equal to that of the permanent mandrel. The joint, and process for making same, of Hutchins is limited to the connection of tubular members of dissimilar materials, particularly aluminum to copper. For obvious reasons such a limitation is undesirable, it being more convenient and economical to utilize a single material for an entire cooling core. Copper particularly has become very expensive. Moreover, a connection between any dissimilar metals is subject to electrolytic action which sets up a continuing corrosion of the metals at the joint. Previously known mechanical deformations of the tubes do not give a fluid tight joint without welding.

The present invention introduces a joint, and method for making the same, in which a constant inside diameter is achieved with joining tubular members each having only a single bell portion. The joint is formed by a purely mechanical connection, and no heating or welding is needed to provide a fluid tight, rigid, permanent joint. It is another characteristic of the presently disclosed joint that it may be easily effected between similar, as well as dissimilar, metals particularly aluminum. This avoids the electrolytic problem mentioned above and also eliminates the need for using copper tubing which has recently experienced a substantial escalation in price.

The invention utilizes a pair of tubular bells telescoped together in mouth to mouth relation. The inner bell is telescoped over an interior tubular mandrel, formed of a strong material which resists inward collapse under the mechanical joint forming process. A novel feature of this mandrel is the provision at one end of a circumferential enlargement and a circumferential groove immediately inboard of and adjacent to the groove or shoulder. The shoulder is sandwiched into the recess between the inner throat of the outside bell and the mouth of the inside bell member. The outer bell is then buckled axially by forcing its opposite ends toward each other, preferably by a pair of split annular dies. This buckling causes a radially inward compression of the inner bell forcing it to crimp into the circumferential groove around the mandrel, and locking it thereto. A convolution of the buckled outer bell collapses circumferentially against the mandrel shoulder to interfere with axial motion of the mandrel relative to the outer bell. Stated otherwise the outer bell is folded slightly around the mandrel shoulder and is thereby locked thereto. The inner and outer bells are thus mutually affixed to the mandrel, being permanently secured thereto in a rigid, permanent, fluid tight joint.

No heating or welding is needed to effect this fluid type connection, and it may be accomplished upon tubular members of similar as well as dissimilar metals. Finally, a constant inside diameter is maintained without the necessity of providing two bell portions on either of the joining tubular members.

Accordingly it is an object of the present invention to provide a novel, tubular mechanical joint and a method for making the same.

It is another object of the present invention to introduce an inexpensive tubular joint, and the method for producing such joint, for cooling cores which cannot be end capped by threaded connecting means.

Another object of the present invention is to teach a method of making a purely mechanical tubular joint without heating, welding, soldering, or sealing, etc.

Still another object of the present invention is to introduce a joint and method for making the same which accomplishes an excellent connection between tubes of similar as well as dissimilar metals.

A still further object of the present invention is to teach a tubular joint, and method for making same, which provides a constant inside tubular diameter without requiring more than a single bell portion on each of the joining tubular members.

Still other objects of the present invention will be apparent to those skilled in the art upon examination of the present specification and attached drawings.

Figure 9:
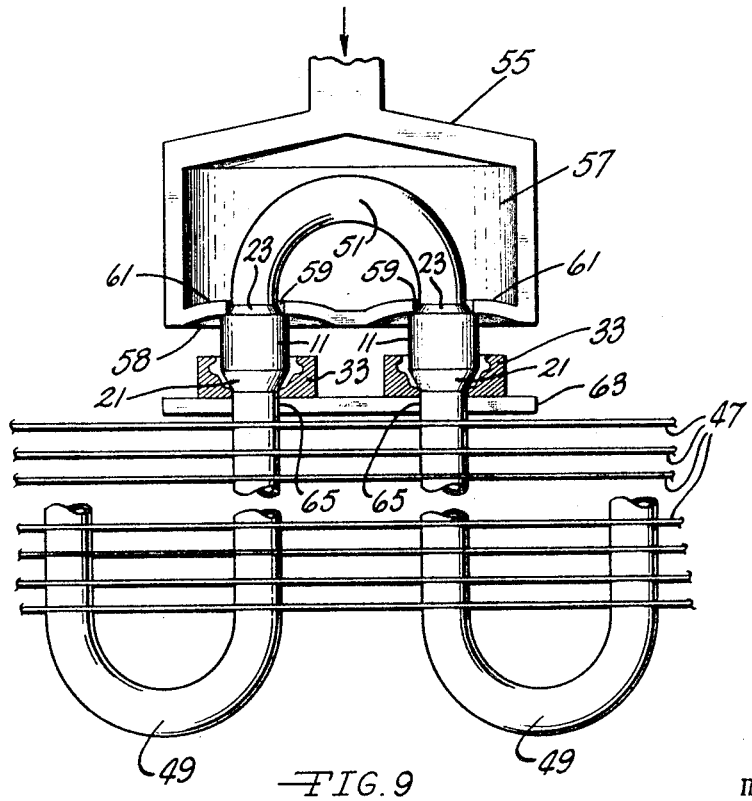

FIGURE 9 is a front elevational view of the structure of the present invention as applied to the attaching of end caps to tube ends projecting from transverse horizontally stacked fins in a refrigerating core system, showing also one half of a split cap die adopted for ramming the U shaped end cap down into mechanical connection with the projecting tube ends, and showing also, in sectional view, annular retainer elements around the exterior throats of the external bell members.

Figure 10:
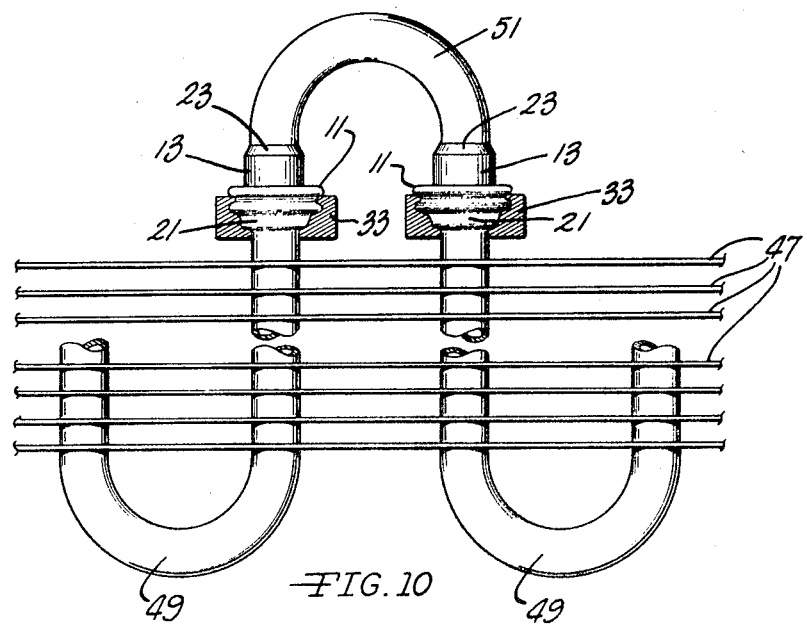

FIGURE 10 shows a completed joint of the present invention as formed from the orientation depicted in FIGURE 9, with the dies removed.

Figure 11:
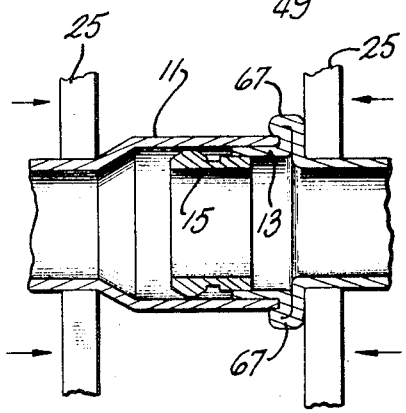

FIGURE 11 shows a longitudinal cross sectional view of an alternative embodiment of the joint of the present invention wherein an annular lip is formed exteriorly on the inner joining tubular member for engagement with the perimeter of the mouth of the outer joining tubular member.

Figure 12:
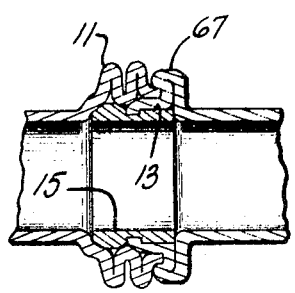

FIGURE 12 shows a joint of the present invention as mechanically formed from the orientation depicted in FIGURE 11.

Figure 13:
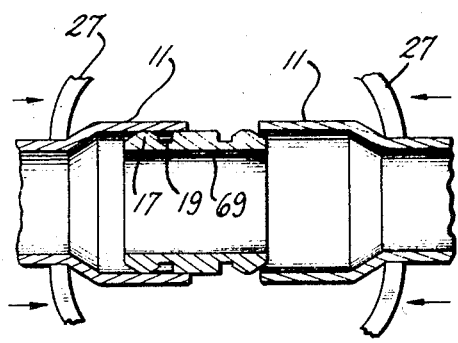

FIGURE 13 shows a longitudinal cross sectional view of an alternative embodiment of a joint of the present invention wherein two identically dimensioned bells are joined without being telescoped together, using a cross sectionally symmetric supporting mandrel having a circumferential groove near each end.

Figure 14:
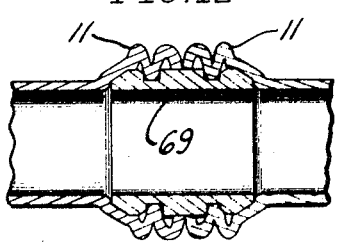

FIGURE 14 shows a joint of the present invention as mechanically formed from the orientation depicted in FIGURE 13.

GENERAL DESCRIPTION

In general a first tubular bell is telescoped over a second tubular member which may be a bell or merely a straight tube. The second member has an outside diameter sized to slip in telescoped relation into the first tubular bell member. A third member comprises a tubular mandrel with a circumferential lip or shoulder at one extreme end. Immediately inboard of the shoulder, and adjacent thereto, is a circumferential groove. The mandrel is of a harder substance than the bells. The main outer dimension of the tubular mandrel is such as to permit the mandrel to slip in a telescoped relation into the second tubular member. Thus the described members are concentrically arranged, proceeding from inside to outside as follows:

First, the tubular mandrel; second, the smaller bell member telescoped over the straight end of the mandrel around the circumferential groove thereof with the mouth of the bell abutting the shoulder of the mandrel; third, the larger bell member telescoped over the mandrel and smaller bell memer, with the circumferential shoulder of the mandrel contained between the inner bell mouth and the outer bell throat.

A first annular die is then placed in abutting relation against the exterior of the throat of the outer bell. The second split annular die is abutted against the mouth of the outer bell and the dies brought together to buckle the outer bell in the axial direction (the dies would be in a split ring configuration to permit their removal thereof from the tubular member). The compressed bell buckles into a convoluted cross sectional shape, the inner folds assuming a position somewhat radially inward from the position occupied by the bell wall prior to buckling. This radial inward collapse compresses the inner tubular bell into a circumferential engagement with the circumferential groove on the supporting mandrel, permanently locking the inner bell to the mandrel. A fold of the buckled outer bell is forced into circumferential engagement with the shoulder of the mandrel, the effect being that the throat of the outer bell is folded tightly around the shoulder of the mandrel to lock the outer bell and mandrel firmly together. The outer bell and inner bell are thus mutually deformed over the support mandrel into a fluid tight connection thereto, to yield a permanent, rigid joint between the bell members.

It is seen that this joint is formed by a purely mechanical swaging or upsetting process without the use of epoxy sealer means, welding or heating techniques, or soldering. The joint is formed quickly, simply, and inexpensively. No unusual configuration of dies is necessary. The effectiveness does not require that the joined tubular members be of dissimilar metals. The joint thus formed requires no more than one bell portion on either of the joined tubular members, while still maintaining a constant inside diameter of the entire tubular connection.

SPECIFIC DESCRIPTION

Figures 1, 2, 3:
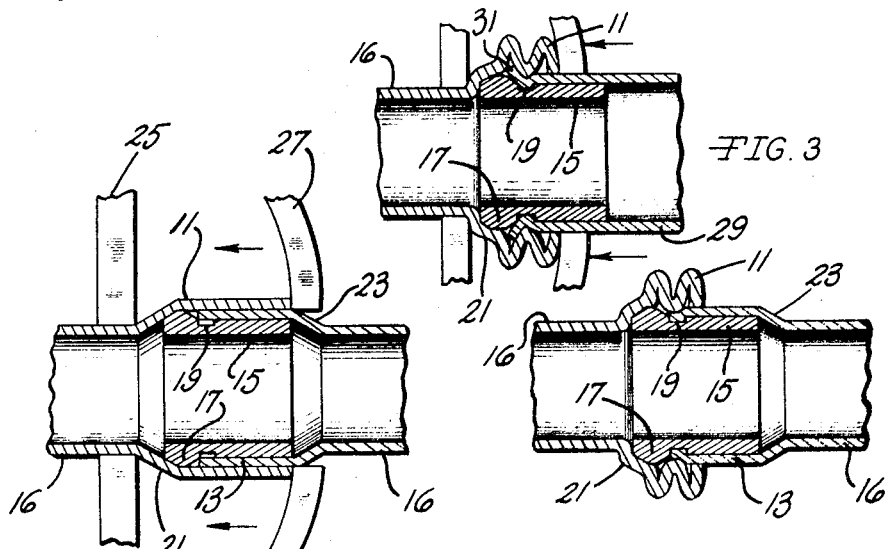
FIGURE 1 is a longitudinal cross sectional view of the structural elements embodied in the joint of the present invention, in telescoped position for mechanical upsetting into a tubular connection, the figure also showing the position and relative motion of a pair of split annular dies.
FIGURE 2 is a longitudinal cross sectional view of a completed joint of the present invention, showing the structure of FIGURE 1 in upset mechanical connection, subsequent to the action of the dies.
FIGURE 3 is a longitudinal cross sectional view of an alternative embodiment of the present invention substantially the same as FIGURE 2 except that the inner joining tubular member is a section of straight tube having no bell portion.

Referring specifically to FIGURE 1, the preferred embodiment of the present invention is seen in cross section. A first outer bell 11 on a tube member 16 is telescoped in an opposed relation over the mouth of a second inner bell 13, also on a tube member 16, and a tubular mandrel 15 is telescoped into the inner bell 13. Accordingly the outside diameter of the inner bell 13 is dimensioned for slip fit into the outer bell 11, and the main outside dimension of the mandrel 15 is dimensioned for slip fit into the mouth of the inner bell 13. The inside diameters of the tubular sections 16 which expand to form the bell portions 11 and 13, are equal to the inside diameter of the mandrel 15, so that the inside diameter of the entire system is substantially constant. The mandrel 15 is seen to be provided with a circumferential enlargement or shoulder 17. Immediately adjacent the shoulder 17, and inboard thereof, is seen a circumferential groove 19 which completely encircles the mandrel, as does the shoulder 17. The three described elements are seen to be so oriented that the circumferential shoulder 17 of the mandrel is axially and concentrically constrained between the throat of the outer bell 11 and the mouth of the inner bell 13. The mandrel 15 has longitudinal dimensions such that when the inner bell 13 is completely telescoped into the outer bell 11 the unshouldered end of the mandrel 15 abuts against the throat 23 of the inner bell 13. In this orientation the mouth of the outer bell 11 is then forced toward the throat 21 thereof, for example by the illustrated relative movement of the split annular dies 25 and 27. The die 27 is preferably somewhat concave in shape, as shown, to assure that the mouth of the bell 11 deforms initially inwardly rather than outwardly.

The joint thus formed by the above described process is best appreciated by reference to FIGURE 2, which shows in cross section the configuration of the two bells and mandrel subsequent to the die action of FIGURE 1. The outer bell 11 is seen to be axially buckled into a convoluted cross sectional shape, the number of convolutions depending upon the length of the bell used, the material of the bell, etc. It can be seen that the radially inward movement of the buckled outer bell 11 compresses the inner bell 13 into circumferential engagement with the peripheral groove 19 of the mandrel 15. The inner bell 13 is thus mechanically interlocked to the mandrel 15.

The outer bell 11 is also seen to be buckled into engagement with the inner face of the shoulder 17 adjacent to the groove 19 so as to interferingly preclude relative axial movement between the shoulder 17 and bell 11. The outer face of shoulder 17 remains in abutment with the interior of the throat 21 of the bell 11, the bell 11 thus being effectively wrapped around the shoulder 17 of mandrel 15. This wrapped around effect locks the bell 11 to the mandrel 15 at the shoulder 17. The inside profile of the cross section of the buckled outer bell 11 thus conforms substantially to the cross sectional profile generated by the mandrel shoulder 17 and the inward circumferential crimp of the inner bell 13. Effectively then, the bells 11 and 13 are joined by mechanical upset into a circumferential constriction yielding a rigid engagement wth the groove and shoulder respectvely of the mandrel 15. The resultant joint is rigid, permanent, uniform and fluid tight.

An alternative arrangement for effecting such a joint can be seen in FIGURE 3. Here one of the joining tubular members is a uniformly dimensioned straight tube 29 having no end bell portion and forming a continuation of smaller tube member 16. Such a straight tube 29 is quite acceptable when it is not required to maintain a constant inside diameter at all stations of the tubular joint. In this situation the ensheathed, i.e., unshouldered, end of the mandrel 15 does not abut against a bell throat, and consequently as the outer bell 11 collapses axially, it frictionally draws the straight tube 29 axially over the mandrel, toward the joint. The mouth of the straight tube 29, moving toward the throat 21 of the outer bell 11, becomes splayed outwardly into the spread portion 31, to become clamped as it were, between the mandrel shoulder 17 and the buckled wall of bell 11. This structural modification provides an effective bell-tube joint equivalent to that resulting from the conjunction of pairs of tubular bell members, as already described.

Figure 4:
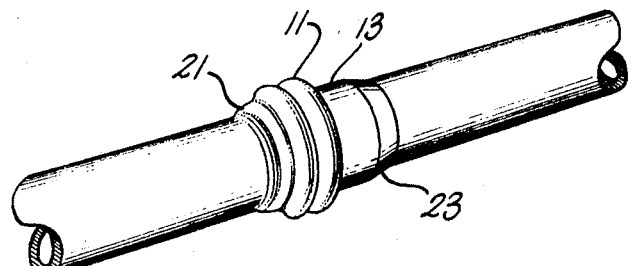
FIGURE 4 is a perspective view of the exterior of a joint of the present invention.

FIGURE 4 depicts the exterior configuration of the conjunctive structure described, and conforms to the embodiment of FIGURE 2, having smoothly curved external bulges as shown. It cannot be too greatly emphasized that the cleanly contoured fluid tight joint as illustrated in FIGURE 4, is of a purely mechanical character, requires no welding, and is equally suitable for connection between similar as well as dissimilar metals.

Figure 5:
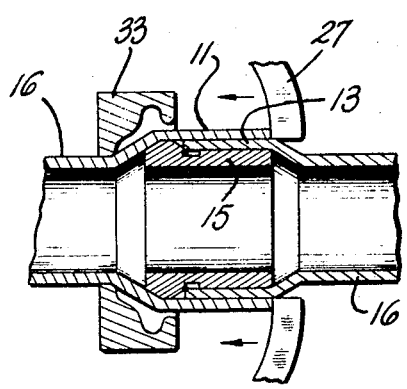
FIGURE 5 is a longitudinal cross sectional view of an alternative embodiment of the structure of the present invention prior to joint formation, showing an annular retainer positioned exteriorly around the throat of the outer tubular bell.
Figure 6:
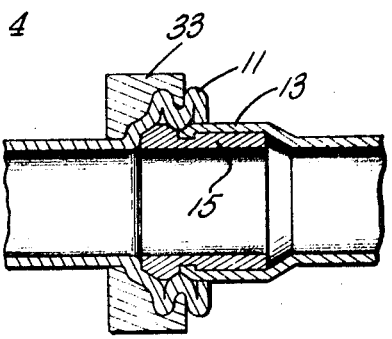
FIGURE 6 is a longitudinal cross sectional view of the joint of the present invention as completely formed subsequent to the orientation of structural elements shown in FIGURE 5.

For joints which must withstand substantial mechanical stress or vibration, an annular retainer 33 may be provided around the exterior of the throat 21 of the outer bell 11, as appreciated by reference to FIGURE 5. The retainer 33 takes the place of the straight die 25. The joint formed from this configuration is seen in FIGURE 6 which shows the retainer 33 pinched about the circumference of one fold of the buckled bell 11. This retainer is not formed in split halves like the ordinary die 25, but is a single circular member, slid over a straight tube 29 of the type shown in FIGURE 3. The retainer, after serving as a die, then remains with the joint to keep the buckled bell 11 pinched radially inward to prevent it from loosening under bending or vibrational stresses.

Figure 7:
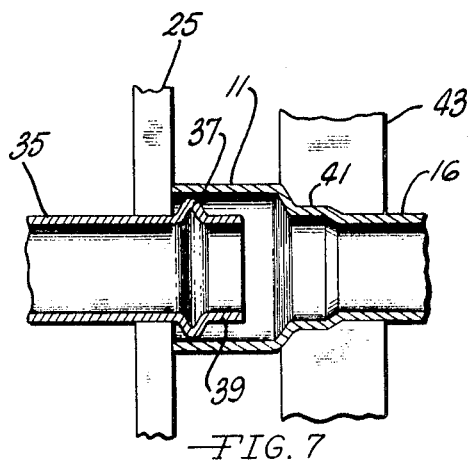
FIGURE 7 is a longitudinal cross section view of an alternative embodiment of the joint of the present invention omitting the tubular supporting mandrel and showing a connecting shoulder formed by a circumferential enlargement of the perimeter of the inner joining tubular member.
Figure 8:
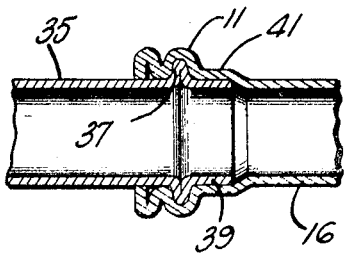
FIGURE 8 shows the subject matter of FIGURE 7 subsequent to the mechanical connection of the joining members from the orientation depicted in FIGURE 7.

Another modified embodiment of the present concept is a tube connection utilizing no mandrel structure whatsoever, as illustrated to best advantage in FIGURES 7 and 8. In this adaptation the mandrel is omited and one of the joining members comprises a relatively hard, unbelled tube 35 which resists radial inward collapse under die pressure. A shoulder 37 is provided on the tube 35 and serves much as the shoulder 17 of the mandrel 15, as depicted by FIGURE 2. The bell 11 is circumferentially locked in a wraparound relation to the shoulder 37, connecting the member 35 to the member 16 in a fluid tight joint. No groove is necessary on the tube 35. The tube 35 may project somewhat beyond the circular bulge 37 in which case the outer bell 11 must be provided with a second constriction in diameter forming a second bell 41 to accommodate the tube extension 39. The second bell is necessary only if a constant inside diameter is desired throughout the connection. Dies 25 and 43 buckle the bell 11 in the fashion heretofore described, die 43 having somewhat different configuration from die 27 (of FIGURES 1 and 3), to conform to the doubly belled tube 16. The joint produced from the modified structure of FIGURE 7 is best appreciated by reference to FIGURE 8. The hump or shoulder 37 of tube 35 is seen, in cross section, to be compressed together interiorly and enfolded by a convolution of the buckled outer bell 11.

FIGURE 9 represents the application of the present invention to the attachment of semicircular cap tubes to the U tubes of cooling cores in refrigerating or air conditioning apparatus. Metal cooling fins 47 are seen to be penetrated repeatedly by the curvilinear windings of the tubes 49 which from the refrigerating core. The upper ends of the U-shaped tubes 49 are joined by a semicircular cap tube 51. The U-tubes and caps are so positioned with respect to each other and the fins 47 that no turning of the U-tubes 49 is possible. Consequently a threaded attachment of the caps 51 is not feasible. Several alternatives to threading have been used previously, e.g., soldering, welding, etc., or combinations of these with mechanical methods. The juncture here illustrated between the U-tubes 49 and the cap 51 is achieved by a purely mechanical joint, of the type already described in the present specification. A modified die structure would be necessary to effect these cap closures, and for illustrative purposes the structure of FIGURE 9 is presented as a possible approach. A cap die 55 is provided in two separable symmetrical halves, one half only of the die being shown in the FIGURE 9. Inside the cap die is a cylindrical chamber 57 for accommodation of the upper portion of the cap 51. The bottom plate 58 of the cap die 55 is provided with two apertures 59 through convex thrust portions 61, which are mildly curved to simulate the concave structure of die 27 as seen in FIGURE 1. When its separable halves are closed about the throats 23 of the bells 13 (not shown) a downward force is applied against the mouth of the outer bell 11. Upward force against the throat 21 of the outer bell 11 is provided by a split thrust platform 63 with holes 65 therein for the U-tubes 49. Optionally, annular retainers 33 may be utilized here for the purposes previously explained, viz., to provide a more vibration resistant connection. When the cap die 55 thrusts downwardly in the direction of the arrow the joint is mechanically formed in the same fashion as already described for connecting straight members. The final form of the mechanical joint is depicted in FIGURE 10, with the dies removed. The result is a rigid, permanent fluid tight connection between the U-tubes 49 and cap tube 51. This same process may be repeated for all the upwardly opening tubes 49 until a complete core is formed. For rapidity of production suitable known means may be arranged for closing all the open ends of the tubes 49 simultaneously.

Another shock and stress resistant configuration may be accomplished by providing a circumferential lip 67 on the inner bell 13 which frictionally engages the mouth of the outer bell 11, as shown in FIGURE 11. Inasmuch as the inner bell 13 moves in conjunction with the buckling outer bell 11 during the upsetting process, the mandrel 15 and inner bell portion 13 are somewhat forshortened to permit this relative inward motion of the inner bell 13. The lengths are predetermined to bring about proper final relative positions of the bells and mandrel. FIGURE 12 shows the joint as completed, with the dies removed.

FIGURE 13 shows still another proposed alternative in which two identically dimensioned symmetrical bells are mechanically joined. In this method, the bells are not telescoped into one another, but are abutted in mouth to mouth relation and then buckled against one another, substantially as shown in FIGURE 13, by the dies moving as indicated by the arrows. A double mandrel 69 is inserted, having a circumferential groove 19 near each end; each of the identical bells 11 is buckled into circumferential engagement with the corresponding groove on the mandrel. The completed joint structure is depicted in FIGURE 14.

It should be understood that the described joint structures comprise one aspect of the present invention, and the methods of forming them, another aspect. The joint structure of the instant invention encompasses such apparatus produced by any method, whether that of the present invention or otherwise.

Having described an operative embodiment of my apparatus and a method for making it, modifications, adaptions and variations will be apparent to those skilled in the art, and such modifications, adaptations, and variations are intended to be included within the scope of the present invention.

I claim:
1. A tube connection comprising:
   a first tube member with a first, inner bell portion, said inner bell portion having an outer circumferential edge portion forming the mouth thereof;
   a second tube member with a second, outer end bell portion opposedly telescoped over said inner bell portion, said outer bell portion having an annular outwardly sloped portion forming the throat thereof; and
   a tubular mandrel having at one end a circumferential shoulder and a circumferential groove adjacent thereto with the shoulder of said mandrel concentrically disposed between the throat of said outer bell and the mouth of said inner bell, the other end of said mandrel being telescoped into said inner bell, both of said bells being inwardly buckled into mutual circumferential engagement with said groove and said shoulder of said mandrel when an axial force is applied to said second tube member at axially spaced points, the outer end bell portion of said second tube member in the assembled position having a plurality of convolutions.

2. The apparatus of claim 1 wherein said inner bell is a straight tube as a continuation of said first tube member.

3. The apparatus of claim 1 wherein said circumferential engagement of said mandrel by said bells comprises a radial inward crimp of said inner bell into said groove on said mandrel, and a radially inward, circumferential crimp of said outer bell about the exterior of said mandrel shoulder and said crimped inner bell.

4. The apparatus of claim 3 wherein the mouth of said inner bell is splayed radially outwardly into a circumferential disposition between said mandrel shoulder and the inside throat of said outer bell.

5. The apparatus of claim 1 with the additional structure comprising: annular retainer means pinched around the exterior of the throat of said second bell, to restrain said second bell from loosening its engagement with said mandrel and first bell.

6. The apparatus of claim 1 wherein the exterior throat portion of said first bell is provided with a circumferential lip in abutment with the perimeter of the mouth of said second bell.

References Cited

UNITED STATES PATENTS

| | | | |
|---|---|---|---|
| Re. 20,055 | 8/1936 | Huck | 29—511 X |
| 868,524 | 10/1907 | Bayer | 285—382 |
| 1,329,479 | 2/1920 | Savon | 285—383.2 |
| 1,678,640 | 7/1928 | Hall | 285—397 X |
| 1,710,811 | 4/1929 | Dewald | 285—157 X |
| 1,783,791 | 12/1930 | Hughes | 29—520 X |
| 2,061,628 | 11/1936 | Huck | 29—511 X |
| 2,180,992 | 11/1939 | Meyers | 29—511 X |
| 2,807,083 | 9/1957 | Zilliacus et al. | 29—520 X |
| 2,949,319 | 8/1960 | Hutchins | 285—397 X |
| 3,210,102 | 10/1965 | Joslin | 285—382.2 X |

FOREIGN PATENTS

| | | |
|---|---|---|
| 16,054 | 1908 | Great Britain. |
| 274,328 | 6/1951 | Switzerland. |

THOMAS F. CALLAGHAN, Primary Examiner

U.S. Cl. X.R.

29—508, 511, 520; 285—397